United States Patent [19]

Stewart

[11] 4,145,572
[45] Mar. 20, 1979

[54] POWER SUPPLY CONTROL CIRCUIT FOR SUBSCRIBER CARRIER TELEPHONE SYSTEM

[75] Inventor: James A. Stewart, Menlo Park, Calif.

[73] Assignee: GTE Automatic Electric Laboratories, Inc., Northlake, Ill.

[21] Appl. No.: 828,014

[22] Filed: Aug. 26, 1977

[51] Int. Cl.² ............................................. H04M 19/06
[52] U.S. Cl. ................................. 179/2 BC; 179/2.5 R; 320/21
[58] Field of Search ........... 179/2.5 R, 2.5 A, 16 AA, 179/2 BC; 307/252 F, 283, 301; 320/21; 1/16 A

[56] References Cited

U.S. PATENT DOCUMENTS

| 3,840,703 | 10/1974 | Stewart | 179/2.5 R |
| 3,934,089 | 1/1976 | Stewart | 179/2.5 R |
| 3,968,333 | 7/1976 | Simokat et al. | 179/2 BC |

OTHER PUBLICATIONS

"Local Battery Charging over Subscribers' Lines", B. R. Freer et al, Post Office Electrical Engineers Journal, vol. 66, Part 2, 7/1973, pp. 73-76.

Primary Examiner—William C. Cooper
Assistant Examiner—Kenneth A. Chayt
Attorney, Agent, or Firm—Russell A. Cannon

[57] ABSTRACT

In a carrier subscriber terminal, a voltage regulator converts the line voltage to a relatively uniform operating voltage for driving a power converter that charges a local battery. The control circuit for the converter comprises a programmable unijunction transistor (PUT) Q1 having a gate and anode connected to intermediate points of associated pairs of resistors R1-R2 and R3-R4 that are electrically connected across the line, and having a cathode connected through a first capacitor C1 and associated discharge path to one side of the line. A Zener diode D5 is resistively connected across the line to establish a reference voltage which is connected through a first diode D1 to the PUT anode, through second and third diodes D2 and D3 to the PUT gate, and through only the second diode D2 to a second capacitor C2 of the regulator. During normal operation, the diodes conduct to connect the reference voltage to the PUT gate and anode to bias the PUT off so that the second capacitor C2 is charged to the Zener-reference voltage. A constant high or increasing line voltage which is greater than a first prescribed value and a constant low or decreasing line voltage which is less than a second prescribed value cut off only the first and third diodes D1 and D3, respectively, to enable the PUT to conduct to dump the charge on the second capacitor C2 into the first capacitor C1 which discharges slowly, when the PUT is again nonconducting after C2 is discharged, to hold the converter off for a long time interval.

28 Claims, 1 Drawing Figure

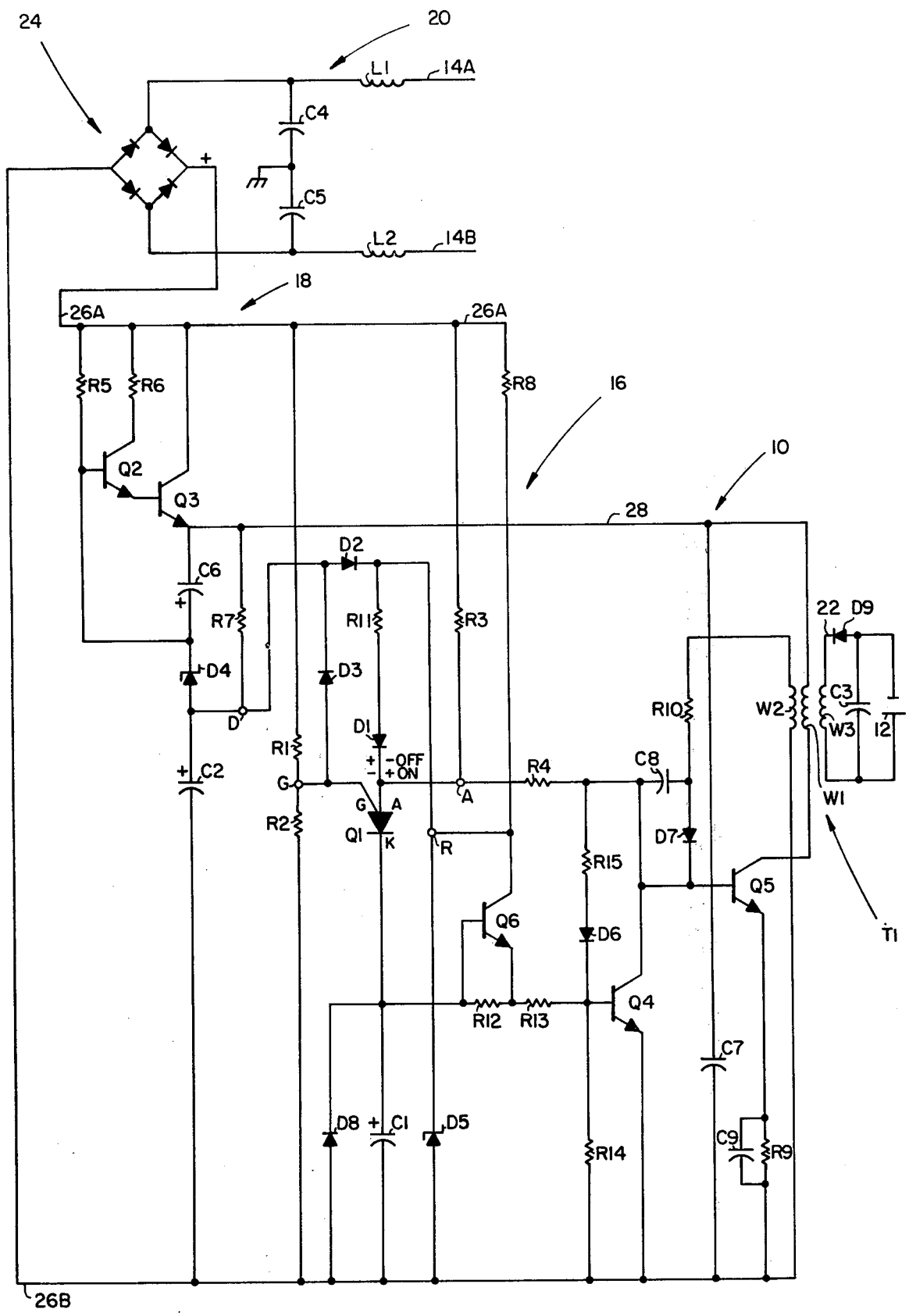

POWER SUPPLY CONTROL CIRCUIT FOR SUBSCRIBER CARRIER TELEPHONE SYSTEM

BACKGROUND OF INVENTION

This invention relates to telephone systems in which a carrier subscriber terminal includes a local battery which is charged with line current from the central office battery, and more particularly to a circuit for automatically disabling the local battery charging circuit for a prescribed time interval for prescribed high and low voltage conditions on the line.

Subscriber carrier techniques are generally employed in telephone systems to increase the number of available telephone channels without increasing the number of cable pairs in the system. Self-contained single channel subscriber carrier equipment including a local battery that is charged with line current from the central office battery was originally employed to provide an additional telephone channel at a location already having an existing physical subscriber telephone channel, the physical and carrier subscriber channels both operating on the same cable pair from the same drop location. It is desirable that the charging circuit of such carrier subscriber station equipment be shut off so that it does not draw line current during off-hook operation of the physical handset. Prior-art disconnect circuits for performing this function are described in U.S. Pat. Nos. 3,840,703 and 3,934,089, issued Oct. 8, 1974 and Jan. 20, 1976, respectively, by James A. Stewart. Single channel subscriber carrier equipment is now becoming more popular and finding increased application at drop locations that may be spaced a considerable distance from the associated physical subscriber drop, and is also finding application on physical loops that include loop extenders. This means that when a physical subscriber handset is off hook, then a high voltage such as 96 volts may be applied to the carrier subscriber station equipment, if it is located much closer to the central office than the physical subscriber station. Also, the central office periodically connects routiner equipment to the cable pair to check for extraneous voltages and leakage on the subscriber loop. When the central office switches the cable pair from the line relay to routiner equipment, the line voltage decreases momentarily during the travel time of the relay. Some routiners make a leakage check as their first test. It is desirable that the carrier subscriber local battery charging circuit be shut off prior to making such a leakage test and that it be capable of operating satisfactorily on cable pairs with loop extenders. It has been determined that the disconnect circuits disclosed in the aforementioned patents do not disconnect the local battery charging circuit from the line fast enough for satisfactory operation of certain routiners and do not operate satisfactorily for extremely long and short spans between physical and carrier subscriber stations on a physical circuit with loop extenders.

An object of this invention is the provision of improved circuitry for selectively disabling the local battery charging circuit of a carrier subscriber station for prescribed voltage conditions on the associated cable pair.

SUMMARY OF INVENTION

In accordance with this invention, the station terminal of a carrier subscriber channel includes a circuit for selectively disabling the charging circuit which charges a local battery from central office battery current on a cable pair. The disabling circuit comprising programmable unijunction transistor type switch means having a cathode, a gate, and an anode, the switch means cathode being electrically connected through a capacitive storage means to one side of a voltage source and one side of the cable pair; first control means for selectively electrically connecting the switch means gate and anode to the other side of the voltage source and to the other side of the cable pair for providing indications of both increasing and high voltages on the cable pair to the switch means anode and for providing indications of both decreasing and low voltage conditions on the cable pair to the switch means gate; and a second control means responsive to charge voltages selectively stored on the capacitive means for selectively holding the charging circuit inoperative for at least a first prescribed time interval. The switch means is responsive to increasing and constant high voltages on the cable pair which are greater than a first prescribed value for greater than a second prescribed time interval for closing momentarially to pass a current therethrough from the voltage source for charging the capacitive means and disabling the charging circuit. The switch means is also responsive to decreasing and constant low voltages on the cable pair which are less than a second prescribed value for greater than the second prescribed time interval for closing to charge the capacitive means.

DESCRIPTION OF DRAWING

This invention will be more fully understood from the following detailed description of the preferred embodiment thereof in the single FIGURE of drawing which is a schematic circuit diagram of carrier subscriber station equipment.

DESCRIPTION OF PREFERRED EMBODIMENTS

The single FIGURE of drawing includes a power converter type charging circuit 10 for charging a local carrier subscriber battery 12 from central office line current on a cable pair 14A,B. The charging circuit 10 is connected through a control circuit 16, a voltage regulator 18, and a line tap circuit 20, to the cable pair 14 for providing approximately 15 milliamp charging current on line 22 for charging the 100 microfarad filter capacitor C3 and the local battery 12. The line tap circuit 20 comprises a balanced LC lowpass filter including a coil having balanced windings L1 and L2 wound on the same core and capacitors C4 and C5 for isolating carrier frequencies from line 14, and a full-wave rectifier 24 to ensure that the charging circuit 10 is connected to line 14 with the correct DC polarity. The rectifier 24 provides the line voltage across lines 26A and 26B with the polarities indicated.

The voltage regulator 18 isolates the lines 26 from the low input impedance to converter 10 and provides a relatively constant operating voltage on line 28 for the converter 10 and control circuit 16. This constant voltage allows circuits 10 and 16 to operate from line voltages of approximately 38 volts to approximately 100 volts for standard physical loops and physical loops equipped with loop extenders, respectively. It also makes the converter 10 operate at a relatively constant frequency so as to simplify control of tone interference generated in the carrier channel. The regulator 18 includes other circuitry for isolating the pulse signals and harmonics thereof in converter 10 from cable pair 14.

The voltage regulator 18 comprises a pair of transistors Q2 and Q3 that are connected as a Darlington compound with the Q2 base connected to the positive line 26A through a bias resistor R5 and the Q2 collector connected to line 26A through a current-limiting resistor R6 which protects Q2 and Q3. A capacitor C6 is connected between the Q3 emitter and Q2 base to filter out pulse signals produced in the regulator. The series combination of the Q3 emitter-collector path, C6, a 15-volt Zener diode D4, and a 35-microfarad electrolytic capacitor C2 is connected across lines 26A and 26B. A resistor R7 of about 200 kohms is connected across C6 and D4 to provide a charging path for C2. The Q3 emitter electrode is also connected to the negative line 26B through a 0.10 microfarad capacitor C7 which is charged to a relatively constant voltage for operating the converter 10 and which filters out high frequency pulse signals in the operation of the latter. The junction D of D4 and C2 is also connected through D2, and a 24-volt Zener diode D5 to the negative input line 26B. When the line 26 voltage is approximately 38 volts, the Zener diodes D4 and D5 operate in a starved current condition to develop only approximately 13 and 22 volts, respectively, across them. The 22 volts produced at node R by conduction of Zener D5 through Q3, R7 and D2 for a 38 volt line 26 voltage is a reference voltage $V_R$ which is coupled through D2 to set the voltage at node D to which C2 is charged to be about 22.6 volts. This 38 volts on lines 26 also causes current flow through R5 and D4 and through Q3 and R7 to charge C2.

The charging circuit-power converter 10 is a regenerative switching circuit with current regulation that has an isolated output provided by transformer T1. The converter 10 operates as a constant current source with the current controlled by fixing the turn-on voltage of Q4 at approximately 1.4 volts by the voltage across the base voltage limiting diode D6 and the Q4 base-emitter junction voltage, and by adjusting the value of bias resistor R9 so that Q5 switches off at the desired current value. Q4 serves the additional function of switching off the converter 10 in response to operation of control circuit 16 as is described more fully hereinafter. R4 is a start-up resistor for Q5. The diode D7 isolates the Q5 base from the feedback winding W2 to allow the start-up resistor R4 to raise the Q5 base to the active region so that regeneration can occur. A small feedback resistor R10, and a small feedback capacitor C8 connected in parallel with D7, are located in the feedback path of Q5 to enable regenerative operation thereof. A small bypass capacitor C9 is connected across R9. Conduction of Q5 causes the current in winding W1 to increase linearly until it is limited by R9. When the voltage across R9 and the Q5 base-emitter junction is approximately equal to and slightly less than the voltage across the Q4 base-emitter junction and D6, than the Q5 current can no longer increase and the field on the transformer windings reverses and decays to charge the battery 12 and C3, and to regeneratively turn off Q5 and turn on Q4. This operation of alternate conduction of Q4 and Q5 continues as long as the line voltage remains at approximately 38 volts.

When the power converter-charging circuit 10 operates from a steady line 26 voltage condition, it is desirable that circuit 10: (1) be turned off for a fixed period of time of greater than one minute following occurrence of a decreasing line 14 voltage of less 35 volts that is of 2-5 milliseconds duration required to discharge C7 and the line 14 capacitance and to charge C1, (this decreasing line voltage corresponding to central office equipment disconnecting the line 14 from an associated line relay and connecting it to a routiner to check the line 14 condition); (2) be turned off for a fixed period of time of at least one minute following occurrence of an increasing line 14 voltage of greater than 105 volts which corresponds to a physical ringing signal on the line 14 or a physical off-hook to on-hook transient on line 14; (3) be held off for a constant line 14 voltage of less than 35 volts, which corresponds to a physical handset being off-hook on a loop in which the carrier subscriber station is located farther from the central office than the physical subscriber station or to a physical handset off-hook on a loop with the carrier station located between the physical drop and the central office such that the voltage drop between the carrier and physical stations is less than about 30 volts; (4) be held off for a constant line voltage of greater than 105 volts to protect elements of regulator 18 so that they do not overheat; and (5) be held off for approximately one minute during start-up conditions of the control and charging circuits 16 and 10 when a physical handset that has been off-hook for a considerable time interval goes on-hook in order to prevent latch up of central office equipment with called party forced release (CPFR) circuitry.

In accordance with this invention, the control circuit 16 comprises a programmable unijunction transistor (PUT) Q1 having its cathode K coupled through storage element C1 to the negative line 26B, having an anode A coupled through D1 and current-limiting resistor R11 to node R, and having a gate G coupled through D3 to node D. The PUT Q1 is responsive to both constant high and constant low line voltages for holding the converter-charging circuit 10 off indefinitely and to both increasing and decreasing transient line voltages for turning it off for at least one minute. Briefly, a PUT is a negative resistance device which conducts, one it is biased on, until it is biased off and the current therethrough falls below the valley current level of its conduction characteristics. Then it turns off. It differs from a conventional unijunction transistor in that its turn-on voltage is programmable by an external voltage that is applied to the gate electrode thereof. It is basically an anode gated SCR and may comprise a pair of transistors each having its collector connected to the base of the other transistor. The PUT is turned on to pass gate to cathode and anode to cathode current when its gate voltage is negative with respect to its anode voltage by greater than the 0.8 volt gate to anode junction voltage. The PUT is turned off when the gate is positive with respect to the anode by 0.8 volt and the anode-cathode current therethrough falls below its valley current level of its conduction characteristic.

The control circuit 16 further comprises the 24-volt Zener diode D5 which conducts through R8 and through R7 and D2 to provide the reference voltage at node R. R1 and R2 are connected across lines 26A and 26B to operate as a voltage divider when D3 is cut off (for line 26 voltages of less than about 32 volts), in order to provide a voltage at node G and the Q1 gate that is approximately 0.7 times the line 26 voltage $V_L$. A 2.6 megohm resistor R3 and the start-up resistor R4 are effectively connected in series across lines 26A and 26B through the conducting one of the transistors Q4 and Q5. R3 and R4 operate as a voltage divider coupling a voltage of about 0.2 $V_L$ to node A (which is connected to the Q1 anode) when D1 is cut off for a line 26 voltage of about 105 volts. C1 is a 2.2 microfarad low leakage tantalum capacitor having the side that is connected to the PUT cathode also connected through 1 megohm bias resistors R12, R13 and R14 to the negative line 26B. During operation with the circuit 10 charging the battery 12, the diodes D1, D2 and D3 are all conducting. D2 is a latching diode which holds Q1 on during initial start-up of the circuits in the FIGURE when the capacitors C1 and C2 there are approximately fully discharged when the physical handset is off-hook for a long time interval. D1 and D3 are latching diodes which are selectively cut off to allow the Q1 anode to go positive and the Q1 gate to go negative, respectively, with respect to the reference voltage at node R. Thus, the Q1 gate voltage that is set by R1 and R2 controls turn on of the PUT for low line voltages. The Q1 anode voltage set by R3 and R4 controls turn on of the PUT for high line voltages. The Q1 low voltage turn-on threshold with D3 cut off is approximately $(R2/(R1+R2)) V_L = 20.6$ volts (which is 1.4 volts below the reference voltage). The Q1 high voltage turn-on threshold with D1 cut off is approximately $(R4/(R3+R4)) V_L = 24.0$ volts (which is about 2.0 volts above the reference voltage).

Briefly, when the PUT Q1 is turned on by either a high or low voltage on lines 26A and 26B, C7 and the capacitance of line 14 discharge through charging circuit 10. Also, C2 dumps its charge into C1 to hold Q4 on to cut off Q5, and to thereby disable charging circuit 10. A few microamperes of current through Q1 will keep it conducting. Q1 is cut off when its gate is at least 0.8 volt positive with respect to its anode and C2 is sufficiently discharged that current through Q1 is less than its valley current. The charging time constant of the 2.2 microfarad capacitor C1 during conduction of Q1 is determined by R11, C1 and C2 and is approximately 0.2 milliseconds. Since it takes only approximately one time constant for C1 to charge to a level sufficient for Q4 to conduct, the control circuit 16 triggers very fast. Current drain for charging local battery 12 from the line 14 drops to less than 0.5 milliamperes in about 3 milliseconds. Considering Q6 absent from the circuit, the discharge time constant of C1 through R12, R13 and R14 when Q1 is nonconducting would be approximately 6 seconds. In order to provide an increased time delay here, a transistor Q6 which has current gain is connected in the discharge path of C1 as a capacitive multiplier. Q6 allows C1 to discharge at approximately a constant current rate to provide an effective discharge time constant of approximately 20 seconds. It takes approximately 3 time constants for C1 to discharge sufficiently to turn off Q4. In this manner, a time delay of at least 1 minute is economically achieved before the converter 10 again operates to charge the local battery 12. The diode D8 is employed to prevent a negative voltage being developed across C1, when the converter 10 is operating, which might damage this electrolytic capacitor C1. R15 is a 56.2 kohm bias resistor.

During operation with an input voltage of approximately 38 volts on lines 26, then Q2 and Q3 and the diodes D1-D5 conduct; Q1 and Q6 are cut off; and Q4 and Q5 alternately conduct to induce a field in the T1 windings which is then allowed to decay to charge the local battery 12. Conduction of the Zener D5 through Q3, R7 and D2 establishes the reference voltage at node R which is coupled through D2 to node D to cause Q2 and Q3 to charge C2 to that voltage. It is conduction of Q2 and Q3 through R7, D2, D1 and the conducting one of the transistors Q4 and Q5 which couples node A and the Q1 anode to the reference voltage. Conduction of D3 through R1, D2 and D1 also couples the PUT gate to the reference voltage. Since the PUT anode and gate are tied to the reference voltage through D1 and through D2 and D3, respectively, the Q1 gate is positive with respect to its anode voltage and Q1 is cut off. There is no charge voltage at this time on C1.

An increasing line 26 voltage tends to cause the node G voltage set by R1 and R2 to become more positive to hold D2 and D3 on. Conduction of these diodes D2 and D3, however, clamps the Q1 gate voltage to the 22 volt reference voltage. The increasing line voltage also causes the voltage produced at node A by R3 and R4 (which is approximately $0.2V_L$) to try to become more positive. When the line 26 voltage is about 105 volts, R3 and R4 are essentially a voltage divider and set a potential at node A that exceeds the difference between the reference voltage and the 0.6 volt drop across D1. This causes D1 to be cut off and the Q1 anode to go more positive than the reference voltage on its gate, which can not go positive since it is clamped to the reference voltage by conduction of D2 and D3. The PUT conducts when its anode is positive with respect to its gate by greater than approximately 0.8 volt to cause D1 to conduct to dump the charge on C2 into C1 to hold Q4 on so as to hold Q5 cut off and the charging circuit 10 disabled. If the line 26 voltage stays at greater than 105 volts, then the potential set by R3 and R4 at node A is approximately 30 volts which holds Q1 on to maintain the charging circuit 10 disabled. If the increasing line 26 voltage is caused by a short-term transient condition such as an off-hook to on-hook transient on the physical channel during dialing, then the voltage set by R3 and R4 at node A falls with the line 26 voltage and Q1 is cut off when it is gated off and the current therethrough falls below its valley current level. C1 will then discharge slowly through the capacitive multiplier circuit comprising R12 and Q6, and through R13 and R14 to hold Q4 conducting and the charging circuit 10 disabled for a time interval of greater than 1 minute. If the line 26 voltage returns to 38 volts at this time, the charging circuit 10 will resume its normal operation with Q4 and Q5 alternately conducting for charging the local battery 12.

The voltage divider R1-R2 is responsive to a decreasing line voltage for causing the node G potential to decrease toward 0 volts. When the voltage at node G is less than the 22.6 volts at node D by approximately 0.6 volt, D3 is cut off to enable the Q1 gate voltage to go negative with respect to its anode voltage which is clamped to the reference potential by conduction of D1. When the Q1 gate voltage is negative with respect to its anode voltage by approximately 0.8 volt, then Q1 turns on to discharge C2 into C1 to hold Q4 on and Q5 off for disabling the charging circuit 10. If the line 26 voltage stays at a potential of less than 35 volts, then the potential set by R1 and R2 and the voltage on D5 (which is less than the Zener voltage) will maintain Q1 on and the charging circuit 10 disabled until the line 26 voltage is only a few volts. If the decreasing line 26 voltage is caused by a short-term transient condition, such as switching of central office equipment from the associated line relay to a routiner, then the node G potential set by R1 and R2 recovers with the line 26 voltage as does the voltage across D5 and the node A potential set by R3 and R4. When Q1 is biased off and the current therethrough falls below its valley point level, Q1 turns off. This causes C1 to discharge through R12-R14 and the capacitive multiplier element Q6 to maintain the charging circuit 10 disabled for a time interval of at least 1 minute.

If the line voltage is low for a long time interval, such as when the associated physical handset is off hook, the voltage on Zener D5 causes Q1 to conduct to hold Q4 on and the charge circuit 10 disabled until the line 26 voltage is sufficiently low that the transistors of regulator 18 and charge circuit 16 will no longer conduct. At this time, both of the capacitors C1 and C2 are effectively discharged such that the voltage at node D is effectively 0 volts. When the line 26 voltage increases rapidly from say 0 volts to 100 volts (e.g., for a physical handset on a loop with a loop extender going on-hook), D3 conducts to set the gate voltage at node G at 0.7 volt above the 0 volts at node D which increases slowly as C2 is charged. The voltage at node R, however, increases rapidly and holds D2 cut off so that D1 conducts to cause the Q1 anode to go positive with respect to its gate. This causes Q1 and Q6 to conduct to bias Q4 into conduction to disable the charging circuit 10. Q1 conducts to charge C1 through R3; through R8, R11 and D1; and through R1. When the line 26 voltage is greater than the D5 Zener voltage, node R is clamped to this reference potential and Q1 continues to conduct until C2 is charged through Q3 and R7 to a voltage high enough to unlatch the Q1 gate and allow it to cut off when the current through Q1 drops below its valley current level. C1 then discharges through R12–R14 to hold Q4 conducting and charging circuit 10 disabled for the prescribed time interval.

Although this invention is described in relation to the preferred embodiment thereof, variations and modifications thereof will occur to those skilled in the art without departing from the spirit of this invention. By way of example, element values and ratios thereof that were indicated in the above example may be changed. Also, the reference voltage and the voltage for selectively charging C1 may be provided by a low impedance voltage source other than the capacitor C2 and Zener diode D5. Further, a capacitor C1 having a much larger capacitance than is specified here for C1 may be employed in place of C1 and the capacitance multiplier element Q6 for providing the desired time delay, although this may be more expensive than the circuit arrangement specified here. Such a capacitor C1 is also physically large. Also, the second voltage divider comprising R3 and R4 may be connected to the negative line 26B through another resistor which is not shown here. It is then only necessary to connect the Q4 collector electrode to the positive line 26A through another start-up resistor for Q5. Such a circuit arrangement involves the expense of and space for two additional resistors over the circuit arrangement described above. The scope of this invention is therefore defined by the appendant claims rather than the aforementioned detailed description.

What is claimed is:

1. Apparatus for selectively disabling the carrier subscriber local battery charging circuit which operates from central office current on the pair of wires of a cable pair, comprising:

first means which is a switch means having first, second and third terminals, having a negative resistance conduction characteristic, and selectively being in an open state or a closed state between first and third terminals; said first means switching from the open to the closed state for passing current between the first and third terminals when the voltage at the second terminal goes more negative than the voltage at the third terminal by a first prescribed amount, and switching from the closed to the open state when the voltage at the second terminal goes positive with respect to the third terminal by a second prescribed amount, which may be equal to the first prescribed amount, and the current therethrough falls below a prescribed minimum current value to bias it off;

second means, electrically connected to said cable pair for, producing a voltage across a pair of output terminals of said second means;

third means, which is a capacitive storage means, electrically connected from the first terminal of said first means to both one terminal of said second means and one wire of said pair for storing a charge voltage from said second means during the closed state of said first means;

fourth means electrically connecting said first means second and third terminals to both the other terminal of said second means and the other wire of said pair, said fourth means providing indications of both increasing and high voltages on said pair to said first means third terminal and indications of both decreasing and low voltage conditions on said pair to said first means second terminal;

said first means being responsive to indications of prescribed voltage conditions such as an increasing or constant high voltage on said cable pair which is greater than a first prescribed value for greater than a first prescribed time interval and a decreasing or constant low voltage on said cable pair which is less than a second prescribed value for greater than the first prescribed time interval, said first means under said prescribed conditions closing to pass a current therethrough from said second means to said third means for causing the latter to store a charge voltage, said first means being opened when the line voltage changes sufficiently to bias it off and the current therethrough falls below the prescribed minimum current value; and fifth means responsive to the charge voltage stored by said third means for holding the charging circuit inoperative for at least a second prescribed time interval.

2. Apparatus according to claim 1 wherein said fourth means selectively disconnects the other terminal of said second means from one of the second and third terminals of said first means for a prescribed voltage condition on said cable pair.

3. Apparatus according to claim 1 wherein said fourth means comprises first and second voltage divider means connected across said wires and having intermediate points electrically connected to associated second and third terminals of said first means.

4. Apparatus according to claim 3 wherein said fourth means comprises a first diode connected in series between the other terminal of said second means and the second terminal of said first means for being cut off for voltages across said pair of less than the second prescribed value for at least the first time interval.

5. Apparatus according to claim 4 wherein said fourth means comprises a second diode electrically connected between the other terminal of said second means and the third terminal of said first means, said second diode being cut off and nonconducting when the voltage across said pair is greater than the first prescribed value for at least the first time interval.

6. Apparatus according to claim 5 wherein said fourth means comprises a third diode in the electrical connection between said second diode and the other terminal of said second means.

7. Apparatus according to claim 1 wherein said second means comprises a first capacitor having one and other terminals electrically connected to associated one and other terminals of said second means, sixth means electrically connecting the other terminal of said first capacitor to the other wire of said cable pair, and seventh means establishing a reference voltage; said fourth means comprising eighth means for selectively electrically coupling the reference voltage to the other terminal of said first capacitor and to both second and third terminals of said first means during at least the major portion of the time interval of operation of the charging circuit for charging the local battery, said eighth means selectively disconnecting the reference voltage from one of the second and third terminals of said first means for prescribed voltage conditions on said pair.

8. Apparatus according to claim 7 wherein said fourth means further comprises first and second voltage divider means electrically connected across said pair and having intermediate points electrically connected to associated second and third terminals of said first means.

9. Apparatus according to claim 8 wherein said eighth means comprises a first diode electrically connected in series between said first means third terminal and the reference voltage for selectively disconnecting the reference voltage from the third terminal of said first means when the voltage across said pair is greater than the first prescribed value.

10. Apparatus according to claim 9 wherein said eighth means comprises a second diode electrically connected in series between said first means second terminal and the reference voltage for selectively disconnecting the reference voltage from the second terminal of said first means when the voltage across said pair is less than the second prescribed value.

11. Apparatus according to claim 10 wherein said eighth means comprises a third diode in the electrical connection of said second diode to the reference voltage, the junction of said second and third diodes being electrically connected to the other terminal of said first capacitor.

12. Apparatus according to claim 11 wherein said seventh means establishing the reference voltage comprises a first resistor and a first Zener diode electrically connected in series across said pair.

13. Apparatus according to claim 12 wherein said sixth means comprises a second Zener diode in the electrical connection between the other terminal of said first capacitor and the other wire of said pair.

14. Apparatus according to claim 13 wherein said third means comprises a second capacitor electrically connected between the first terminal of said first means and the said wire.

15. Apparatus according to claim 14 wherein said fifth means comprises capacitive multiplier means in the discharge path of said second capacitor.

16. Apparatus according to claim 15 wherein said fifth means comprises a first transistor having its base-emitter junction in the discharge path of said second capacitor and being responsive to the charge voltage on the latter for selectively rendering the charging circuit for the local battery inoperative.

17. Apparatus responsive to prescribed voltage conditions on the pair of wires of a cable pair such as an increasing or constant high voltage on said cable pair which is greater than a first prescribed value for greater than a first prescribed time interval and a decreasing or constant low voltage on said cable pair which is less than a second prescribed value for greater than the first prescribed time interval, for selectively-automatically rendering a carrier subscriber local battery charging circuit (which is in operation connected through said cable pair to a central office power source) inoperative for at least a second time interval which is greater than the first time interval that one of said prescribed voltage conditions is present on said pair, comprising:
  programmable unijunction transistor (PUT) means having cathode, gate and anode;
  voltage source means electrically connected across said cable pair and having a pair of output terminals;
  capacitive storage means electrically connected from said PUT means cathode to one terminal of said source means and to one wire of said pair;
  first means electrically connecting the PUT means gate and anode to the other terminal of said source means and the other wire of said pair so as to provide indications of both increasing and high voltage conditions on said pair to said PUT means anode, and indications of both decreasing and low voltage conditions on said pair to said PUT means gate;
  said PUT means being responsive to indications of an increasing or constant high voltage condition on said pair which is greater than the first value for greater than the first time interval and of a decreasing or constant low voltage condition on said pair which is less than the second value for greater than the first time interval, provided by said first means which make the PUT means gate negative with respect to its anode by greater than a prescribed amount for conducting to pass a current therethrough from said source means to said storage means for producing a charge voltage on the latter, said PUT means being nonconducting when the voltage across said pair changes sufficiently to bias it off and the current therethrough falls below a minimum-valley current value; and
  second means responsive to a charge voltage on said storage means for holding said charging circuit inoperative for at least the second time interval following conduction of said PUT means.

18. Apparatus according to claim 17 wherein said source means comprises a first capacitor having one and other terminals electrically connected to associated output terminals of said source means and third means electrically connecting the other terminal of said first capacitor to the other wire of said pair.

19. Apparatus according to claim 18 wherein said source means further comprises fourth means establishing a reference voltage, said first means comprising fifth means for selectively electrically coupling the reference voltage to the other terminal of said first capacitor and to both gate and anode of said PUT means during at least the major portion of the time interval of operation of the charging circuit for charging the local battery, said fifth means selectively disconnecting the reference voltage from one of the gate and anode of said PUT means for certain of the prescribed voltage conditions on said pair.

20. Apparatus according to claim 19 wherein said first means further comprises first and second voltage divider means electrically connected across said pair and having intermediate points electrically connected to the associated gate and anode of said PUT means.

21. Apparatus according to claim 20 wherein said fifth means comprises a first diode electrically connected in series between said PUT means anode and the reference voltage for selectively disconnecting the reference voltage from the anode when the voltage across said pair is greater than the first prescribed value for the first time interval.

22. Apparatus according to claim 21 wherein said fifth means further comprises a second diode electrically connected in series between said PUT means gate and the reference voltage for selectively disconnecting the reference voltage from the gate when the voltage across said pair is less than the second prescribed value for the first time interval.

23. Apparatus according to claim 22 wherein said fifth means further comprises a third diode in the electrical connection of said second diode to the reference voltage, the junction of said second and third diodes being electrically connected to the other side of said first capacitor.

24. Apparatus according to claim 23 wherein said fourth means establishing the reference voltage comprises a first resistor and a first Zener diode electrically connected in series across said pair.

25. Apparatus according to claim 24 wherein said third means comprises a second Zener diode.

26. Apparatus according to claim 25 wherein said storage means comprises a second capacitor.

27. Apparatus according to claim 26 wherein said second means comprises capacitive multiplier means in the discharge path of said second capacitor.

28. Apparatus according to claim 27 wherein said second means further comprises a transistor having its base-emitter junction in the discharge path of said second capacitor and being responsive to the charge voltage on the latter for selectively rendering the charging circuit inoperative.

* * * * *